United States Patent
Liang et al.

(10) Patent No.: US 12,379,058 B2
(45) Date of Patent: *Aug. 5, 2025

(54) QUICK PIPE CONNECTOR

(71) Applicant: TAIZHOU AILUN VALVE CO., LTD, Yuhuan (CN)

(72) Inventors: Hewen Liang, Yuhuan (CN); Shicheng Liang, Yuhuan (CN); Chienyu Lin, New Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/410,977

(22) Filed: Jan. 11, 2024

(65) Prior Publication Data
US 2024/0401730 A1   Dec. 5, 2024

(30) Foreign Application Priority Data
Jun. 2, 2023   (CN) .......................... 202321397279.2

(51) Int. Cl.
*F16L 37/00*   (2006.01)
*F16L 37/091*   (2006.01)

(52) U.S. Cl.
CPC .......... *F16L 37/0915* (2016.05); *F16L 37/008* (2013.01)

(58) Field of Classification Search
CPC .............................. F16L 37/0915; F16L 37/091
See application file for complete search history.

(56) References Cited

U.S. PATENT DOCUMENTS

| | | | | |
|---|---|---|---|---|
| 2008/0314205 A1* | 12/2008 | Feliciano | ................ | B25B 27/10 81/426 |
| 2011/0025054 A1* | 2/2011 | Kluss | .................. | F16L 37/0915 29/592 |
| 2012/0074695 A1* | 3/2012 | Salehi-Bakhtiari | ......................... | F16L 37/0915 285/377 |
| 2021/0285584 A1* | 9/2021 | Ravisankar | ......... | F16L 37/0915 |

FOREIGN PATENT DOCUMENTS

| | | | | | |
|---|---|---|---|---|---|
| EP | 1521027 A1 | * | 4/2005 | .......... | F16L 37/0915 |
| GB | 1555640 A | * | 11/1979 | .......... | F16L 37/0915 |
| NL | 9500045 A | * | 8/1996 | ............ | F16L 37/091 |
| WO | WO-0036327 A1 | * | 6/2000 | ............. | B29C 65/08 |
| WO | WO-2012116403 A1 | * | 9/2012 | .............. | F16L 21/02 |

* cited by examiner

*Primary Examiner* — Matthew Troutman
*Assistant Examiner* — James A Linford
(74) *Attorney, Agent, or Firm* — Tsz Lung Yeung

(57) ABSTRACT

A quick pipe connector includes a connector body, a sealing ring, a securing ring, an engaging member and a coupling sleeve. The engaging member is arranged to bias against the securing ring and includes a plurality of catching claws. The coupling sleeve includes a main sleeve member and an extension sleeve extending from the main sleeve member to engage with the connector body in such a manner that when a pipe is inserted in the connector body, the extension sleeve, the sealing ring, the securing ring and the engaging member are securely biased and retained between the connector body and the main sleeve. The catching claws are arranged to securely bias against an external surface of the pipe while the extension sleeve is arranged to bias against an external contour of a connecting portion of the connector body.

9 Claims, 5 Drawing Sheets

QUICK PIPE CONNECTOR

BACKGROUND OF THE PRESENT INVENTION

Field of Invention

The present invention relates to connector, and more particularly to a quick pipe connector which is easy to use and structurally reliable so as to minimize the chance of leaking at the quick pipe connector or the junctions between two pipes.

Description of Related Arts

Chinese patent CN201187650Y disclosed a rapid connecting structure for pipes. The rapid connecting structure comprises a main body with a connecting hole which can be clamped with a connecting pipe inserted into the connecting hole, a closing ring arranged in the connecting hole and fixed in the connecting hole through a positioning mechanism, an annular pipe socket, and an O-shaped sealing ring. The closing ring is provided with a plurality of jack catches inclined towards the connecting hole. The annular pipe socket is capable of pulling off the jack catches when it is pressed towards the inner side of the connecting hole. The O-shaped sealing ring is fixed in the connecting hole and is arranged at the inner side of the closing ring. When a connecting pipe is inserted into the connecting hole, the jack catches on the closing ring and clamp on the connecting pipe.

In addition, the rapid connecting structure further comprises a barrel-type casing and a retainer ring fixed between the barrel-type casing and the attachment hole. A collar is clipped between a retainer ring and the barrel-type casing.

A major disadvantage of the rapid connecting structure as described above is that when the pipe is subject to high pressure, the barrel-type casing may detach from the main body and this may cause the O-shaped sealing ring and the retainer ring to detach from the main body as well. All these may cause leaking at the rapid connecting structure.

As a result, there is a need to provide a rapid connecting structure which is easy to use and structurally reliable so as to minimize the chance of leaking at the rapid connecting structure.

SUMMARY OF THE PRESENT INVENTION

Certain variations of the present invention provide a quick pipe connector which is easy to allow connecting to a pipe in a structurally reliable manner so as to minimize the chance of leaking when a pipe is connected to the quick pipe connector.

Certain variations of the present invention provide a quick pipe connector comprising a coupling sleeve for securely biasing against a sealing ring, a securing ring and an engaging member so as to allow a pipe to be securely connected to the quick pipe connector without accidentally detaching therefrom, even when the pipe is under high pressure.

In one aspect of the present invention, it provides a quick pipe connector for connecting to a pipe, comprising:

a connector body having a main portion, a connecting portion extending from the main portion, and a through passage extending in the main portion and the connecting portion, the connecting portion having a diameter larger than that of the main portion so as to form a shoulder at an intersection between the connecting portion and the main portion in the through passage, the connecting body further having a opening forming at the connecting portion and communicating with the through passage;

a sealing ring positioned in the through passage of the connector body and retained in position by the shoulder;

a securing ring attached to the connecting portion of the connector body in such a manner that the securing ring is arranged to bias against the sealing ring;

an engaging member which is arranged to bias against the securing ring and comprises a plurality of catching claws; and a coupling sleeve comprising a main sleeve member having a through hole communicating with the through passage of the connector body, and an extension sleeve extending from the main sleeve member to engage with the connecting portion of the connector body, in such a manner that when the pipe is inserted in the connector body, the sealing ring, the securing ring and the engaging member are securely biased and retained between the connector body and the main sleeve member, the catching claws of the engaging member are arranged to allow the pipe to pass through the engaging member and subsequently bias against an external surface of the pipe while the extension sleeve being arranged to bias against an external contour of the connecting portion so as to securely connect the pipe to the connector body.

This summary presented above is provided merely to introduce certain concepts and not to identify any key or essential features of the claimed subject matter.

DETAILED DESCRIPTIONS OF THE PRESENT INVENTION

Figure 1:
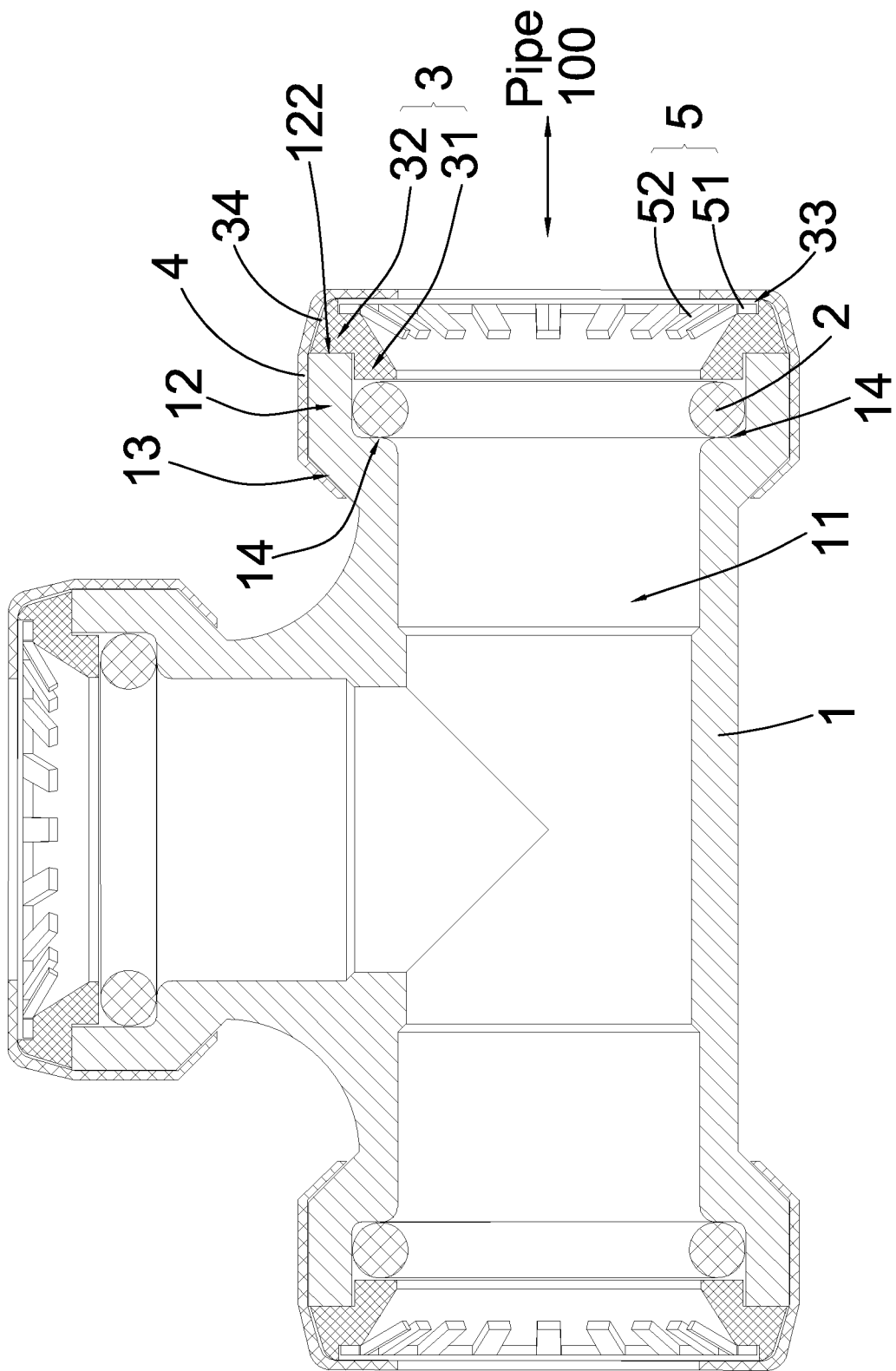
FIG. 1 is a sectional side view of a quick pipe connector according to a preferred embodiment of the present invention.

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" may refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", "vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection may refer to permanent connection or detachable connection. Therefore, the above terms should not be an actual connection limitation of the elements of the present invention.

Referring to FIG. 1 to FIG. 5 of the drawings, a quick pipe connector according to a preferred embodiment of the present invention is illustrated. The quick pipe connector may be connected to at least two pipes, such as two water pipes 100. The purpose of the quick pipe connector is to allow convenient and secure connections between at least two pipes so as to allow fluid such as water to flow from one pipe to the other through the quick pipe connector of the present invention. Broadly, the quick pipe connector may comprise a connector body 1, a sealing ring 2, a securing ring 3, an engaging member 5 and a coupling sleeve 4.

The connector body 1 may have a main portion 10, a connecting portion 12 extending from the main portion 10, and a through passage 11 extending in the main portion 10 and the connecting portion 12. Each of the main portion 10 and the connecting portion 12 may have a substantially cross sectional shape, wherein the connecting portion 12 may have a diameter larger than that of the main portion 10 so as to form a shoulder 14 at an intersection between the connecting portion 12 and the main portion 10 in the through passage 11. The connector body 1 may further have an opening 15 forming at the connecting portion 12 and communicating with the through passage 11.

The sealing ring 2 may be positioned in the through passage 11 of the connector body 1 and retained in position by the shoulder 14.

The securing ring 3 may be attached to the connecting portion 12 of the connector body 1 in such a manner that the securing ring 3 may be arranged to bias against the sealing ring 2 in the through passage 11.

The engaging member 5 may be arranged to bias against the securing ring 3 and may comprise a plurality of catching claws 52.

The coupling sleeve 4 may comprise a main sleeve member 42 having a through hole 4201 communicating with the through passage 11 of the connector body 1, and an extension sleeve 41 extending from the main sleeve member 42 to engage with the connecting portion 12 of the connector body 1, in such a manner that when the pipe 100 is inserted in the connector body 1, the sealing ring 2, the securing ring 3 and the engaging member 5 may be securely biased and retained between the connector body 1 and the main sleeve member 42. The catching claws 52 of the engaging member 5 may allow the pipe to pass through the engaging member 5 and subsequently bias against an external surface of the pipe 100 while the extension sleeve 41 may be arranged to bias against an external contour of the connecting portion 12 so as to securely connect the pipe 100 to the connector body 1.

According to the preferred embodiment of the present invention, the connector body 1 may be configured from rigid, erosive-resistant and strong material such as stainless steel or reinforced composite material. The connector body 1 may have a plurality of openings 15 formed thereon, wherein each of the openings 15 may be connected to a pipe 100. The openings 15 may also communicate with the through passage 11, so that the connector body 1 as a whole may be configured to form a hollow structure. The quick pipe connector of the present invention provides a rapid and convenient mechanism by which the pipe 100 may be connected thereto and detached therefrom, so that when two or more pipes 100 are connected to the quick pipe connector of the present invention, fluid such as water flowing from one of the connected pipes 100 may flow into the other connected pipes 100 through the quick pipe connector of the present invention. As shown in FIG. 1 of the drawings, the connector body 1 may have three openings 15 formed on a left side, a right side and a top side of the connector body 1 respectively.

For the sake of clarity, note that the connecting mechanism at each of the openings 15 is structurally identical. The description presented herein is applicable to all openings 15. For example, the descriptions presented above are applicable to one of the openings 15. When the connector body 1 has two openings for connecting two pipes 100, the connection between each pipe 100 and the corresponding opening 15 of the connector body 1 will be identical and will not be repeated throughout this description.

As shown in FIG. 1 of the drawings, the connecting portion 12 may have a cross-sectional diameter larger than that of the main portion 10 so as to constitute an enlarged part with respect to the main portion 10. The connecting portion 12 may radially and outwardly extend from the main portion 10 to be connected to the corresponding pipe 100. The intersection between the connecting portion 12 and the main portion 10 may form a shoulder 14 in the through passage 11. This shoulder 14 may be a sidewall in the through passage 11 having a sharp turning or cornering due to a sudden change in diameter. Therefore, when viewed from an exterior of the connector body 1, the connecting portion 12 may form a step 13 with respect to the main portion 10.

The sealing ring 2 may be provided in the through passage 11 at a position at the shoulder 14. In other words, the shoulder 14 may form a space in the through passage 11 for accommodating the sealing ring 2. The sealing ring 2 may be configured as having an annular shape and may have a central opening 21 communicating with the corresponding opening 15 of the connector body 1. Referring to FIG. 1 of the drawings, the sealing ring 2 may bias against the shoulder 14 so that when an inward pushing force (in the direction toward the main portion 10 of the connector body 1) is applied to the sealing ring 2, the sealing ring 2 may be securely held in position by the shoulder 14. Thus, a diameter of the sealing ring 2 may correspond to the cross-sectional diameter of the shoulder 14 when viewed from the side of the connector body 1.

Figure 2:
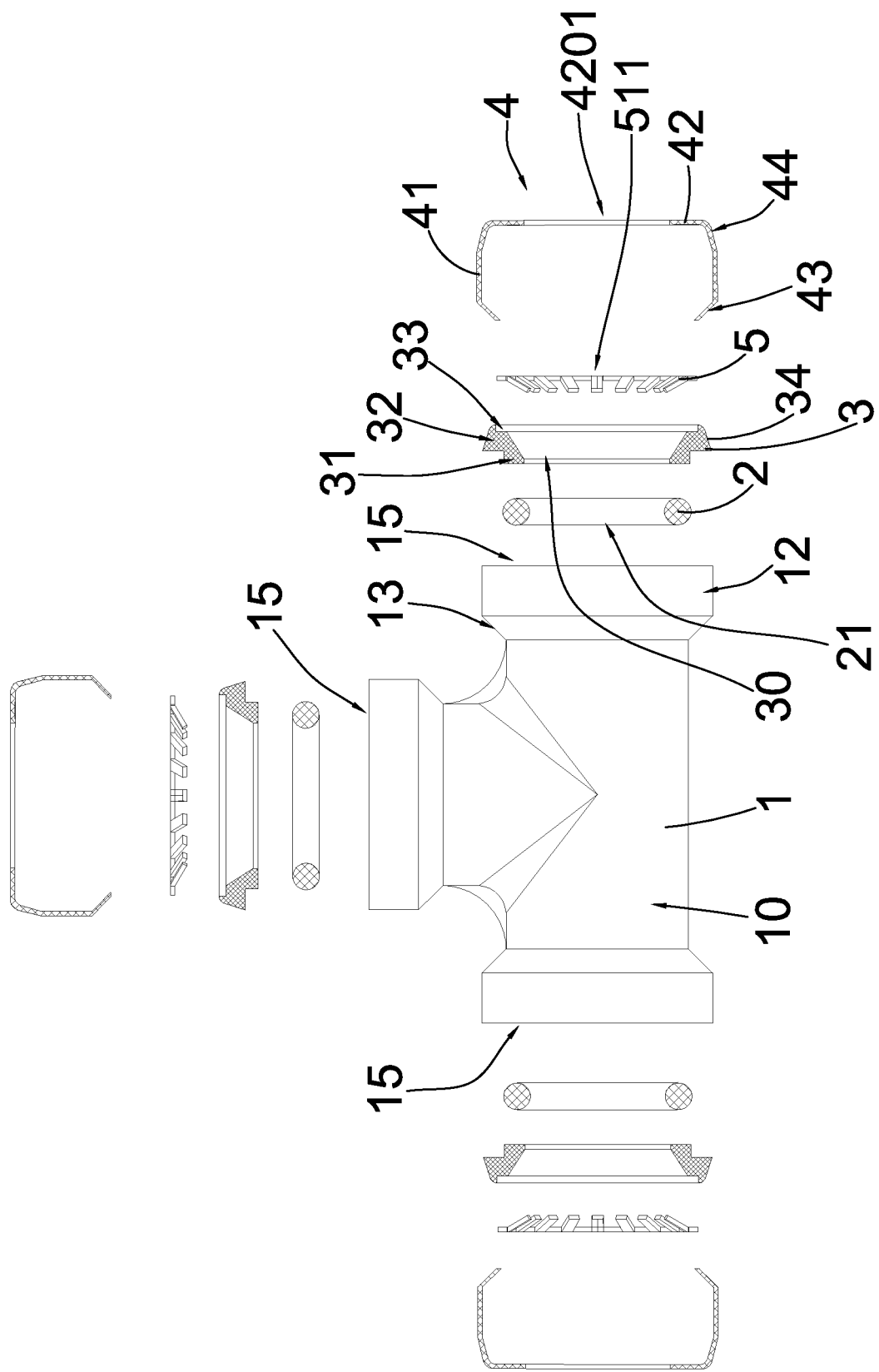
FIG. 2 is an exploded side view of the quick pipe connector according to the preferred embodiment of the present invention.

Referring to FIG. 1 to FIG. 2 of the drawings, the securing ring 3 may be secured in the connecting portion 12 of the connector body 1. Specifically, the securing ring 3 may be attached on the connecting portion 12 at an outer side of the sealing ring 2 and may be arranged to bias against the sealing ring 2. In other words, at least some portions of the sealing ring 2 may be sandwiched between the shoulder 14 and the securing ring 3.

The securing ring 3 may be fittedly coupled with the connecting portion 12 of the connector body 1 and the sealing ring 2. More specifically, the securing ring 3 may be configured as having an annular structure and may also have a through opening 30 communicating with the central opening 21 of the sealing ring 2 and the corresponding opening 15 of the connector body 1.

Moreover, the securing ring 3 may have a contracted inner annular portion 31 and an enlarged outer annular portion 32 radially extending from the contracted inner annular portion 31. As shown in FIG. 1 of the drawings, the contracted inner annular portion 31 may be arranged to bias against the sealing ring 2, while the enlarged outer annular portion 32 may extend from the contracted inner annular portion 31 and bias against an outermost side surface 122 of the connecting portion 12 of the connector body 1. Thus, the securing ring 3 may be geometrically configured to fittedly bias against the sealing ring 2 and the connecting portion 12 of the connector body 1. In this preferred embodiment of the present invention, the enlarged outer annular portion 32 may integrally extend from the contracted inner annular portion 31 so that the securing ring 3 may form a single integral body. Moreover, the enlarged outer annular portion 32 may integrally extend from the contracted inner annular portion 31 and may be concentrical in geometrical arrangement.

The securing ring 3 may further define a securing platform 33 peripherally formed on an outer side of the enlarged outer annular portion 32 for accommodating the engaging member 5. The securing platform 33 may be formed by having an indention formed on the outer side of the enlarged outer annular portion 32, wherein the engaging member 5 may be fittedly supported on the securing platform 33 of the securing ring 3.

The engaging member 5 may comprise an annular frame member 51 and a plurality of catching claws 52 extending from the annular frame member 51 toward the main portion 10 of the connector body 1. The annular frame member 51 may have an annular opening 511 overlapping with the with the central opening 21 of the sealing ring 2 and the through opening 31 of the securing ring 3. The annular frame member 51 may be supported on the securing platform 33, while the catching claws 52 may spacedly extend toward the main portion 10 of the connector body 1.

Each of the catching claws 52 may be configured to be elastic and slightly deformable and so may be arranged to bias against (i.e. "catch") the pipe 100 extending through the through passage 11. Each of the catching claws 52 is configured such that when the pipe 100 is pushed toward the connector body 1, the catching claws 52 may slightly deform to allow the pipe 100 to pass through the annular frame member 51 and bias against an external surface of the pipe 100. However, once the pipe 100 passes through the catching claws 52 and the annular frame member 52, the catching claws 52 may exert a biasing force to the pipe 100 so as to prevent the pipe from being pulled out from the connector body 1.

On the other hand, the coupling sleeve 4 may be connected to the connecting portion 12 of the connector body 1 and bias against the securing ring 3 and the engaging member 5. Referring to FIG. 1 to FIG. 2 of the drawings, the main sleeve member 42 of the coupling sleeve 4 may bias against the enlarged outer annular portion 32 of the securing ring 3 which in turn may bias against the outermost side surface 122 of the connecting portion 12 of the connector body 1. At the same time, the contracted inner annular portion 31 may be arranged to bias against the sealing ring 2.

The through hole 4201 of the coupling sleeve 4 may overlap with the through opening 30 of the securing ring 3 so that the pipe 100 may be able to be inserted into the connector body 1 through sequentially passing through the through hole 4201, the through opening 30 of the securing ring 3, and the central opening 21 of the sealing ring 2. The main sleeve member 42 may be configured to have an annular structure having a diameter substantially the same as an external diameter of the connecting portion 12 of the connector body 1.

The extension sleeve 41 may extend from the main sleeve member 42 toward the connector body 1 for forming a substantially tubular structure to securely embed the connecting portion 12 of the connector body 1. The extension sleeve 41 may be configured to have a coupling end portion 43 and an extension portion 44 extending between the coupling end portion 43 and the main sleeve member 42.

As shown in FIG. 1 of the drawings, the extension portion 44 of the extension sleeve 41 may extend over an outer surface 321 of the enlarged outer annular portion 32 of the securing ring 3, a peripheral surface 123 of the connecting portion 12, while the coupling end portion 43 may extend from the extension portion 44 to catch and bias against the step 13 of the connector body 1.

In this preferred embodiment of the present invention, the coupling end portion 43 may inwardly extend from the extension portion 44 so that a cross sectional diameter of the coupling end portion 43 may gradually decrease from the extension portion 44 toward the main portion 10 of the connector body 1 along a longitudinal direction thereof. This structure may allow the extension sleeve 41 to fittedly embed the connecting portion 12 of the connector body 1. The gradually decreasing diameter of the coupling end portion 43 may also fittedly correspond the contour of the step 13 of the connector body 1. As shown in FIG. 1 of the drawings, the step 13 may have a diameter gradually increasing from the main portion 10 toward the connecting portion 12 of the connector body 1.

Moreover, the enlarged outer annular portion 32 of the securing ring 3 may have an outer diameter gradually decreasing from the contracted inner annular portion 31 toward the main sleeve member 42 while the extension portion 44 of the extension sleeve 41 may have a cross sectional diameter correspond to the outer diameter of the enlarged outer annular portion 32 of the securing ring 3. All these ensure tight and secure attachment of the coupling sleeve 4 on the securing ring 3 and the connector body 1.

It is worth mentioning that the coupling sleeve 4 may be configured from metallic or plastic material. When it is configured from metallic material, the coupling member 4 may be manufactured by pressing technology. When the coupling sleeve 4 is configured from plastic material, it may be manufactured by injection molding. The coupling sleeve 4 may be securely connect to the connector body 1 for facilitate easy connection and retrieval of the pipe 100.

Figure 3:
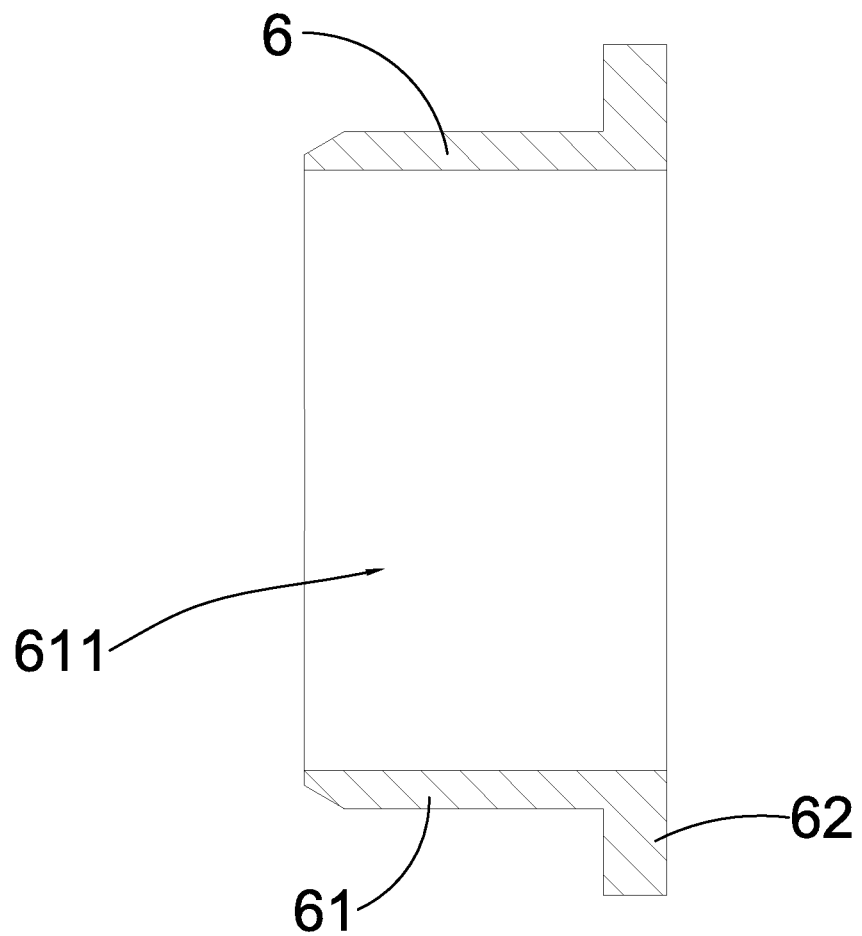
FIG. 3 is a sectional side view of a pipe detachment tool of the quick pipe connector according to the preferred embodiment of the present invention.

Referring to FIG. 3 of the drawings, the quick pipe connector of the present invention may further comprise a pipe detachment tool 6 selectively attached on the connector body 1 for facilitating easy detachment of the pipe 100 from the connector body 1. More specifically, the pipe detachment tool 6 may be configured as a having a tubular structure and may comprise an insertion tube 61 and a ridge 62 radially and outwardly extending from the insertion tube 61. The insertion tube 61 may have an inner through hole 611 having a diameter larger than that of the pipe 100 so that the pipe 100 may be inserted in the insertion tube 61.

The insertion tube 61 may be arranged to be inserted in the connector body 1 in such a manner that the insertion tube 61 may be inserted between the pipe 100 and the catching claws 52 so that when the insertion tube 61 is inserted toward the main portion 10 of the connector body 1, the catching claws 52 may be pushed outwardly for releasing the biasing force against the pipe 100. Thus, the pipe 100 may be conveniently released from the connector body 1.

The operation of the present invention may be described as follows: a user may manually insert the pipe 100 into the connector body 1 through the through hole 4201 of the main sleeve member 42. Since the sealing ring 2, the securing ring 3 and the coupling sleeve 4 are fittedly coupled together in the manner described above, and the pipe 100 is securely retained by the catching claws 52, the pipe 100 may be securely connected to the quick pipe connector of the present invention with minimal chance of leaking.

Figure 4:
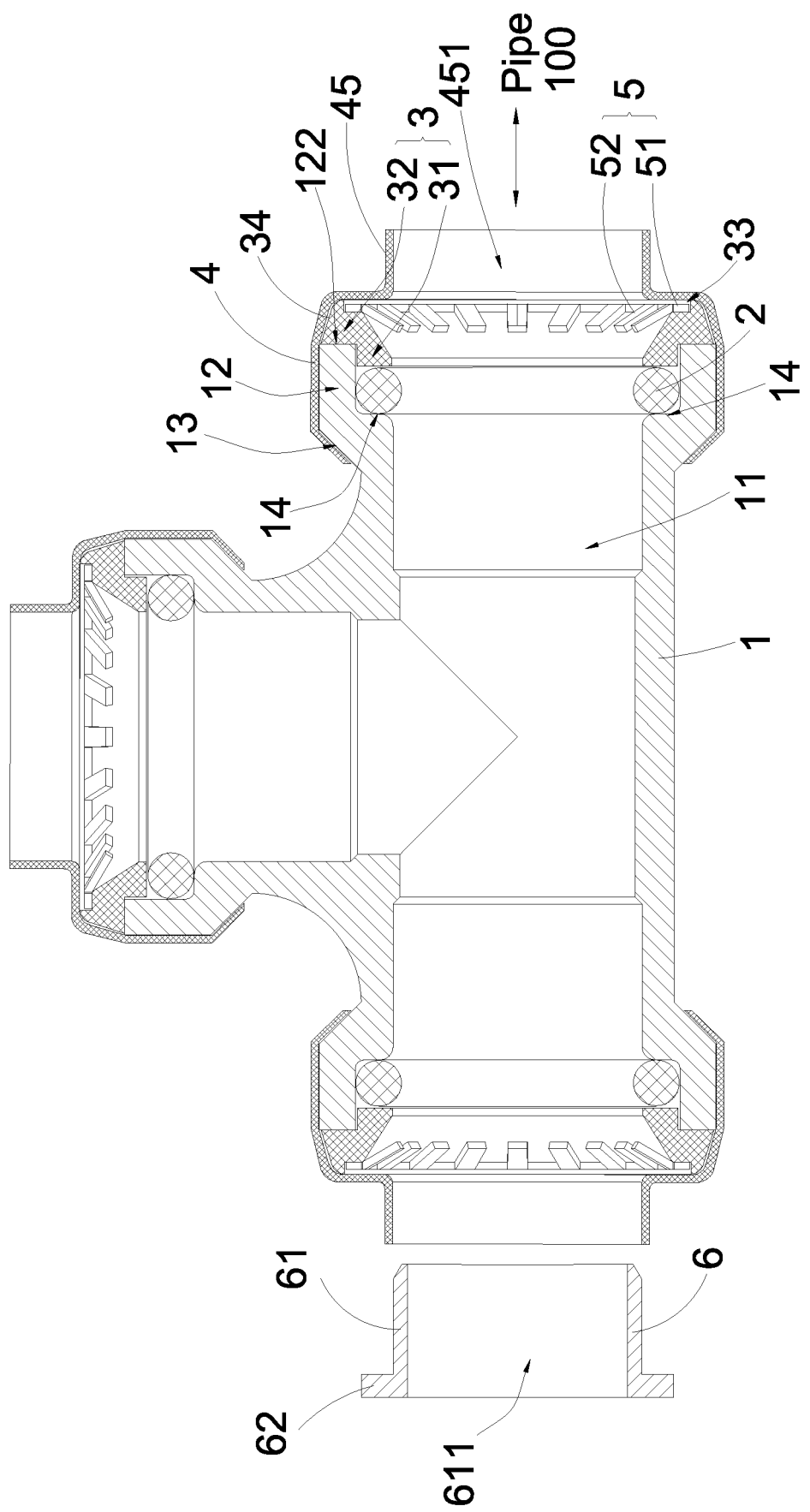
FIG. 4 is a sectional side view of a quick pipe connector according to an alternative mode of the preferred embodiment of the present invention.
Figure 5:
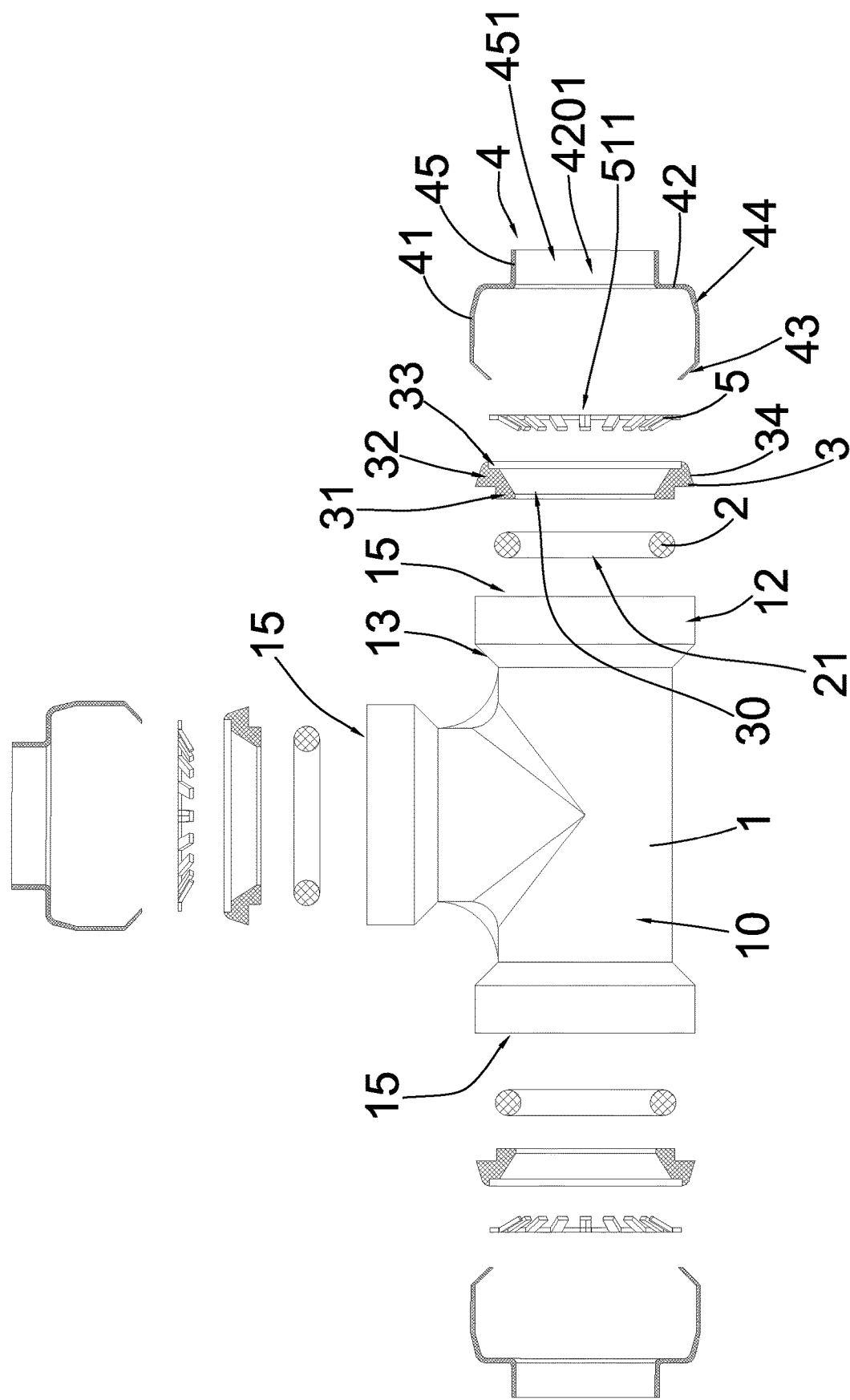
FIG. 5 is an exploded side view of a quick pipe connector according to an alternative mode of the preferred embodiment of the present invention.

Referring to FIG. 4 to FIG. 5 of the drawings, in an alternative mode of the present invention, the coupling sleeve 4 may further comprise a guiding tube 45 outwardly extending from the main sleeve member 42 in a direction away from the connector body 1, wherein the guiding tube 45 may form a tubular structure and have a central channel 451 overlapping and communicating with the through hole 4201 of the main sleeve member 42. The guiding tube 45 may guide the user to insert the pipe 100 into the connector body 1 through the guiding tube 45.

The present invention, while illustrated and described in terms of a preferred embodiment and several alternatives, is not limited to the particular description contained in this specification. Additional alternative or equivalent components could also be used to practice the present invention.

What is claimed is:

1. The quick pipe connector for connecting to a pipe, comprising:

a connector body having a main portion, a connecting portion extending from the main portion, and a through passage extending in the main portion and the connecting portion, the connecting portion having a diameter larger than that of the main portion so as to form a shoulder at an intersection between the connecting portion and the main portion in the through passage, the connecting body further having an opening forming at the connecting portion and communicating with the through passage;

a sealing ring positioned in the through passage of the connector body and retained in position by the shoulder, the sealing ring being configured as having an annular shape and having a central opening communicating with the corresponding opening of the connector body, the sealing ring being arranged to bias against the shoulder so that when an inward pushing force in the direction toward the main portion of the connector body is applied to the sealing ring, the sealing ring is securely held in position by the shoulder;

a securing ring attached to the connecting portion of the connector body in such a manner that the securing ring is arranged to bias against the sealing ring, wherein the securing ring is configured as having an annular structure and has a through opening communicating with the central opening of the sealing ring and the opening of the connector body, the securing ring having a contracted inner annular portion and an enlarged outer annular portion radially extending from the contracted inner annular portion, the contracted inner annular portion being arranged to bias against the sealing ring, while the enlarged outer annular portion extending from the contracted inner annular portion and being arranged to bias against an outermost side surface of the connecting portion of the connector body, the enlarged outer annular portion integrally extending from the contracted inner annular portion so that the securing ring forms a single integral body, the enlarged outer annular portion and the contracted inner annular portion being concentrical;

an engaging member which is arranged to bias against the securing ring and comprises a plurality of catching claws; and a coupling sleeve comprising a main sleeve member having a through hole communicating with the through passage of the connector body, and an extension sleeve extending from the main sleeve member to engage with the connecting portion of the connector body, in such a manner that when the pipe is inserted in the connector body, the sealing ring, the securing ring and the engaging member are securely biased and retained between the connector body and the main sleeve member, the catching claws of the engaging member are arranged to allow the pipe to pass through the engaging member and subsequently bias against an external surface of the pipe while the extension sleeve being arranged to bias against an external contour of the connecting portion so as to securely connect the pipe to the connector body, wherein the securing ring further defines a securing platform peripherally formed on an outer side of the enlarged outer annular portion for accommodating the engaging member, the securing platform is formed by having an indention on the outer side of the enlarged outer annular portion, wherein the engaging member is fittedly supported on the securing platform of the securing ring.

2. The quick pipe connector, as recited in claim 1, wherein the engaging member further comprises an annular frame member, wherein the catching claws extend from the annular frame member toward the main portion of the connector body, the annular frame member having an annular opening overlapping with the with the central opening of the sealing ring and the through opening of the securing ring, the annular frame member being supported on the securing platform, while the catching claws spacedly extending toward the main portion of the connector body.

3. The quick pipe connector, as recited in claim 2, wherein each of the catching claws is configured to be elastic and deformable and is arranged to bias against a pipe extending through the through passage, the catching claws being configured such that when the pipe is pushed toward the connector body, the catching claw are arranged to slightly deform so as to allow the pipe to pass through the annular frame member and bias against an external surface of the pipe, wherein when the pipe passes through the catching claws and the annular frame member, the catching claws are arranged to exert a biasing force to the pipe so as to prevent the pipe from being pulled out from the connector body.

4. The quick pipe connector, as recited in claim 3, wherein the main sleeve member of the coupling sleeve is arranged to bias against the enlarged outer annular portion of the securing ring which in turn biases against the outermost side surface of the connecting portion of the connector body, the contracted inner annular portion of the securing ring is arranged to bias against the sealing ring.

5. The quick pipe connector, as recited in claim 4, wherein the extension sleeve is configured to have a coupling end portion and an extension portion extending between the coupling end portion and the main sleeve member, the extension portion extending over an outer surface of the enlarged outer annular portion of the securing ring, a peripheral surface of the connecting portion, while the coupling end portion extending from the extension portion to catch and bias against a step of the connector body.

6. The quick pipe connector, as recited in claim 5, wherein the coupling end portion inwardly extends from the extension portion so that a cross sectional diameter of the coupling end portion decreases from the extension portion toward the main portion of the connector body along a longitudinal direction thereof.

7. The quick pipe connector, as recited in claim 6, wherein the enlarged outer annular portion of the securing ring has an outer diameter decreasing from the contracted inner annular portion toward the main sleeve member while the extension portion of the extension sleeve has a cross sectional diameter correspond to the outer diameter of the enlarged outer annular portion of the securing ring.

8. The quick pipe connector, as recited in claim 7, further comprising a pipe detachment tool selectively attached on the connector body for facilitating easy detachment of the pipe from the connector body, the pipe detachment tool comprising an insertion tube and a ridge radially and outwardly extending from the insertion tube, the insertion tube being arranged to be inserted between the pipe and the catching claws so that when the insertion tube is inserted toward the main portion of the connector body, the catching claws are pushed outwardly for releasing the biasing force against the pipe.

9. The quick pipe connector, as recited in claim 8, wherein the coupling sleeve further comprises a guiding tube outwardly extending from the main sleeve member in a direction away from the connector body, wherein the guiding tube forms a tubular structure and has a central channel overlapping and communicating with the through hole of the main sleeve member for guiding a user to insert the pipe into the connector body through the guiding tube.

\* \* \* \* \*